(12) United States Patent
Hao et al.

(10) Patent No.: US 9,083,726 B2
(45) Date of Patent: Jul. 14, 2015

(54) AUTOMATIC CONTENT PUBLICATION AND DISTRIBUTION

(71) Applicant: Verizon Patent and Licensing Inc., Basking Ridge, NJ (US)

(72) Inventors: Jianxiu Hao, Lexington, MA (US); Wei Xia, Sudbury, MA (US); Xuefeng Yao, Weston, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 36 days.

(21) Appl. No.: 14/023,880

(22) Filed: Sep. 11, 2013

(65) Prior Publication Data

US 2015/0074413 A1     Mar. 12, 2015

(51) Int. Cl.
*H04L 9/30* (2006.01)
*H04L 9/32* (2006.01)
*H04L 29/06* (2006.01)

(52) U.S. Cl.
CPC ............ *H04L 63/123* (2013.01); *H04L 9/3247* (2013.01)

(58) Field of Classification Search
CPC .................................. H04L 63/08; H04L 65/40
USPC ............... 380/30, 45, 172, 279; 713/172, 190
See application file for complete search history.

(56) References Cited

U.S. PATENT DOCUMENTS

| | | | |
|---|---|---|---|
| 2003/0145066 A1* | 7/2003 | Okada et al. .................. | 709/219 |
| 2005/0257260 A1* | 11/2005 | Lenoir et al. .................... | 726/21 |
| 2007/0250901 A1* | 10/2007 | McIntire et al. .............. | 725/146 |
| 2008/0240447 A1* | 10/2008 | Zhu et al. ...................... | 380/279 |

OTHER PUBLICATIONS

"Recommendations for Standardized Implementation of Digital Privacy Controls"—CIO Council, Dec. 2012 https://cio.gov/wp-content/uploads/downloads/2012/12/Standardized_Digital_Privacy_Controls.pdf.*

* cited by examiner

*Primary Examiner* — Randy Scott

(57) ABSTRACT

A method and system relate to receiving, by a network device, information associated with a client device; determining, by the network device, that the client device is authorized to access digital content associated with a content provider; and forwarding, by the network device, authentication data to the content provider. The authentication data includes, for example, information identifying the client device, and an indication that the client device is authorized to access the digital content. The content provider enables the client device to access the digital content based on the authentication data.

20 Claims, 7 Drawing Sheets

AUTOMATIC CONTENT PUBLICATION AND DISTRIBUTION

BACKGROUND

A service provider may provide customers with digital content from multiple content providers. The service provider may determine that the customer is entitled to receive digital content if, for example, the customer subscribes to a channel associated with the digital content and/or the customer purchases specific access to the digital content. If the customer is entitled to access the digital content, the customer may, for example, the customer may receive a location and/or an identifier of a stored version of digital content, and if the digital content is encrypted, the customer may receive a decryption code to decode the digital content. In some situations, the customer may use the received data to access the digital content via different client devices (e.g., mobile devices, computers, set top boxes, tablets, gaming machines, etc.).

DETAILED DESCRIPTION OF PREFERRED EMBODIMENTS

The following detailed description refers to the accompanying drawings. The same reference numbers in different drawings may identify the same or similar elements.

Systems and/or methods described herein may enable a service provider to manage relationships with customers, such as to receive orders from a customer for digital content (e.g., television and/or other digital media content), to coordinate with content providers to perform entitlement verification and digital rights management associated with the orders, and initiate access to the digital content through the content providers. This configuration allows the service provider to manage content from multiple content providers and to enable new content to be provided to customers with minimal changes to network configuration. The service providers and/or the content provider may receive feedback related to a near real-time status of the access to the digital content by the customer, and service providers may use this feedback to coordinate additional services and/or applications related to the digital content. For example, the service providers may provide a customer with information regarding items, places, and/or people related to a portion of digital content viewed by the customer, or may allow the customer to interact with other customer viewing a related portion of the digital content.

As used herein, the terms "user," "consumer," "subscriber," and/or "customer" may be used interchangeably. Also, the terms "user," "consumer," "subscriber," and/or "customer" intended to be broadly interpreted to include a user device or a user of a user device. "Digital content," as referred to herein, includes a unit of digital content that may be provided to a customer. The unit of digital content may include, for example, a segment of text, a defined set of graphics, a URL, a script, a program, an application or other unit of software, a media file (e.g., a movie, television content, music, etc.), a document, or an interconnected sequence of files (e.g., HLS streaming media files).

Figure 1:
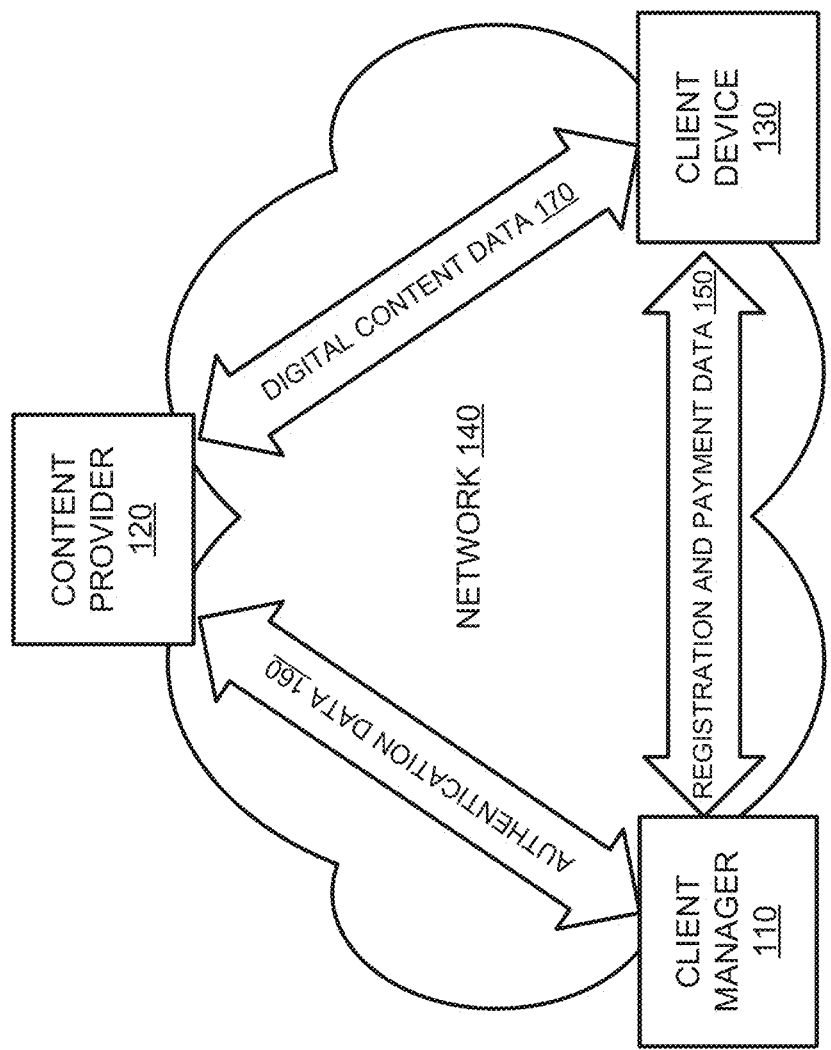
FIG. 1 illustrates an exemplary system that separates content delivery by a content provider to a client device and application/billing, customer relations, and/or advertisement associated with a service provider.

FIG. 1 provides a schematic diagram of exemplary system 100 in accordance with implementations described herein. As illustrated in FIG. 1, system 100 may include, for example, service provider 110, content provider 120, and client device 130 linked by a network 140. Service provider 110 may interact with client device 130 to exchange order and payment data 150 and may forward authentication data 160 to content provider 120 to initiate transmission of digital content data 170 to client device 130.

Techniques described herein may be used to separate content delivery (e.g., digital content data associated with content provider 120) from application/billing, customer relations, and/or advertisement associated with service provider 110. The techniques described herein may further provide a super pipe for content delivery from multiple content providers 120 to client devices 130 associated with service provider 110. Within system 100, content provider 120 may adjust price/promotions and may provide dynamic advertisement directly to client device 130 (e.g., through digital content data 170). Content provider 120 may view real-time consumer usages related to digital content data 170 and may adjust market campaigns based on real-time consumer usages (e.g., reduce pricing to increase usage of unpopular digital content and/or increase pricing of popular digital content). Content provider 120 may control data to publish to client device 130 to implement release planning-control by changing content publication windows. For example, content provider 120 may selectively provide digital content data 170 to client devices in a particular geographic area and/or may use pricing that is specific to that area.

Service provider 110 may include one or more network devices, or other types of computation or communication devices, to store and/or generate user profile information for client device 130. The user profile information may include various information regarding client device 130, such as login information (e.g., a user identifier and a password), billing information, address information, types of services to which the user has subscribed, a list of digital content purchased/rented by the user, a user device identifier (e.g., a media player identifier, a mobile device identifier, a set top box identifier, a personal computer identifier) for client device 130. Content provider 120 may use the user profile information to authenticate client device 130 and may update the user profile information based on activity associated with client device 130, such as purchases by client device 130. Service provider 110 may also include one or more network devices, or other types of computation or communication devices, to manage billing client device 130 for services provided via network 140. Service provider 110 may also manage revenue calculations for content providers 120 based on usage of the digital contents by client device 130.

Content provider 120 may be include one or more network devices, or other types of computation or communication devices, that store and deliver content to customers (e.g., to client device 130). The content may include, for example, television broadcasts, video-on-demand (VOD) programming, or other video content. In one implementation, content provider 120 may be associated with one or more content delivery networks (CDN to deliver digital content to client device 130.

Client device 130 may include a device that is capable of communicating over network 140. In implementations described herein, client device 130 may have the capability to present content from content provider 120. Client device 130 may include, for example, a radiotelephone, a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, or other types of computation or communication devices. Client device 130 may also include a set-top box (STB), a connected television, a laptop computer, a tablet computer, a personal computer, a game console, or other types of computation and/or communication devices. In one implementation, Client device 130 may include a client application that allows a user to interact with service provider 110 and/or content provider 120 to order and/or receive broadcast content and special-order (e.g., VOD, pay-per-view event, etc.) content. In some implementations, client device 130 may also include a client application to allow video content to be presented on an associated display.

Network 140 may include a local area network (LAN), a wide area network (WAN), a metropolitan area network (MAN), a wireless network, an optical fiber (or fiber optic)-based network, a cable television network, a satellite television network, and/or a combination of networks. In one implementation, network 140 may include an Internet Protocol (IP)-based network. In some implementations, network 140 may include a private network controlled by, for example, a telecommunications company that provides television, telephone, and/or data access to client device 130. In another implementation, network 140 may be a public network, such as the Internet, or a combination of public and private networks. According to implementations described herein, network 140 may include a closed distribution network. The closed distribution network may include, for example, cable, optical fiber, satellite, or virtual private networks that restrict unauthorized alteration of content delivered by a service provider. For example, the closed distribution network may be implemented by client device 130 or through use of secure/encrypted network communications to client device 130.

Network 140 may also include a network that distributes or makes available services, such as, for example, television services, mobile services, and/or Internet services. Network 140 may be a satellite-based network and/or a terrestrial-based network. In implementations described herein, network 140 may support television services for a customer associated with client device 130. Network 140 may include, for example, content storage and distribution devices, customer information devices, billing devices, application devices, content information devices, security/licensing devices, advertising information devices, etc.

Service provider 110 may interact with client device 130 to exchange order and payment data 150. Order and payment data 150 may include information identifying client device 130 (e.g., a network address or an account number associated with client device 130). When there is fee associated with accessing the digital content, order and payment data 150 may further include payment information (e.g., a service account identifier, a bank account number, a credit card number, etc.) and/or data authorizing service provider 110 to charge client device 130 for access to the digital content. Order and payment data 150 may also include information identifying the requested digital content (e.g., a title or other identifier associated with the digital content or other metadata associated with the digital content).

Service provider 110 may process order and payment data 150 to form authentication data 160, and service provider 110 may provide authentication data 160 to content provider 120. For example, authentication data 160 may include information identifying client device 130 and/or the digital content requested by client device 130. Authentication data 160 may further include information confirming that client device 130 is entitled to access the digital content. For example, authentication data 160 may include information confirming that an appropriate payment has been received from client device 130 to access the digital content. Authentication data 160 may also include information identifying other client devices 130, associated with client device 130, that may be entitled to access the requested digital content through content provider 120. For example, authentication data 160 may identify client devices 130 associated with the same household or customer premises.

Content provider 120 may use authentication data 160 to provide digital content data 170 to client device 130. Digital content data 170 may include a version of the requested digital content that is formatted to be compatible with client device and/or network 140. For example, content provider 120 may select a version of the digital content based on configuration information about client device 130 (e.g., compatible display and/or sound output formats) or network 140 (e.g., bandwidth, quality of service, etc.). The compatibility information may be received from service provider 110 and/or client device 130 or may be determined by content provider 120. For example, content provider 120 may send test data to client device 130 to test parameters of network 140 and may evaluate a response from client device 130 to determine capabilities of client device 130.

Digital content data 170 may further include promotional materials from content provider 120. For example, digital content data 170 may include a listing of digital contents available from content provider 120 and/or pricing information regarding the available digital contents. Content provider 120 may customize the listing and/or the pricing information directly to client device without interacting with the service provider 110. Content provider 120 may directly control what information is provided to (or hidden from) client device 130. For example, content provider 120 may differentiate between different client devices 130 associated with service provider 110, such as to designate preferred customers (e.g., frequent purchasers) or customer receiving different pricing for the digital contents (e.g., digital content testers or reviewers). Furthermore, since content provider 120 provides digital content data 170 to client device 130, content provider 120 may determine real-time consumer usages associated with the digital content data 170 and may dynamically adjust market campaigns based on the real-time consumer usages.

In one implementation, digital content data 170 may also include data or a program related to accessing the digital content through content provider 120. For example, digital content data 170 may identify an encoding scheme (e.g., a codec) used for the digital content and/or may include a program for handling the encoding scheme.

Although FIG. 1 shows exemplary components of system 100, in other implementations, system 100 may include fewer components, different components, differently arranged components, or additional components than depicted in FIG. 1. For example, system 100 may include multiple content providers 120 and/or multiple client devices 130. Also, in some instances, a component of system 100 may perform one or more functions described as being performed by another component or group of components of system 100 and/or multiple components may a function described as being performed by a single component of system 100. For example, authentication data 160 may include information indicating that client device 130 is associated with service provider 110, but content provider 120 handle billing and collections related to providing digital content data 170 to client device 130.

Figure 2:
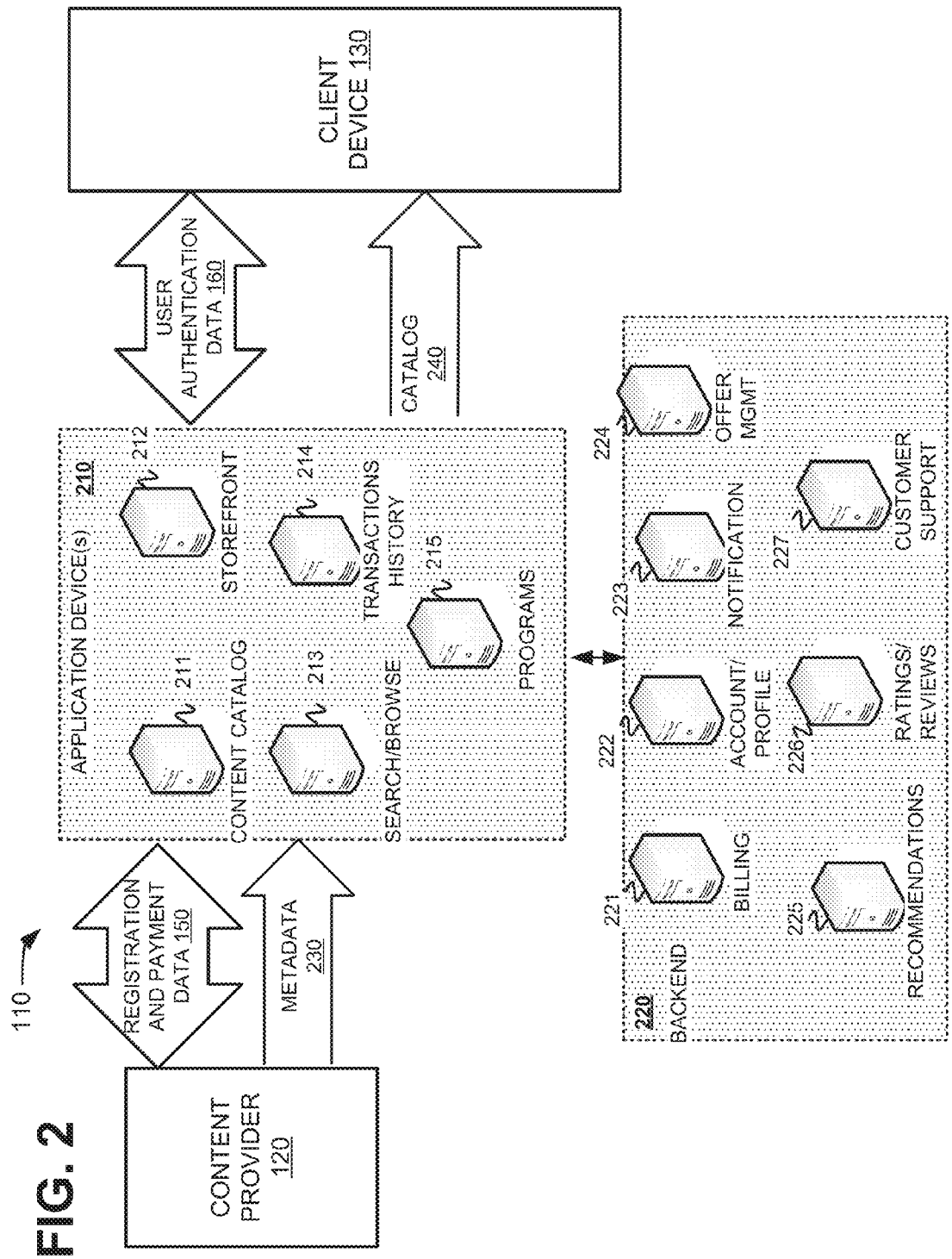
FIG. 2 is a diagram of exemplary components of the service provider included in the system of FIG. 1.

FIG. 2 provides exemplary components that may be included in service provider 110 in accordance with an implementation provide herein. As illustrated in FIG. 2, service provider 110 may include one or more application devices 210 to exchange registration and payment data 150 with client device 130 and to exchange authentication data 160 with content provider 120. Service provider 110 may further include one or more backend devices 220 to support the operation of application devices 210.

Application devices 210 may include, for example, content catalog device 211, storefront device 212, search/browse device 213, transactions history/usage tracking device 214, and/or program device 215. Content catalog device 211 may include a network device that stores a catalog 240 of content that customers may browse and/or search to buy, rent or subscribe content. Content catalog device 211 may receive catalog 240 (e.g., from content provider 120) or may form the catalog 240 based on information associated with the digital content (e.g. metadata 230 received from content provider 120).

Storefront device 212 may include a network device that implements transaction management (e.g., a shopping cart) and manages promotions and advertisements. Search/browse device 213 may include a network device that searches digital content cataloged by content catalog device 211 and may locate relevant content based on, for example, one or more keywords. Search/browse device 213 may also permit client device 130 to browse the content cataloged by content catalog device 211 via, for example, a hierarchical catalog structure (e.g., alphabetical by title, by date).

Transactions history/usage tracking device 214 may include a network device that tracks usage of the content cataloged by content catalog device 211. The customer usage may include interactions with any of application devices 210 and the transactions in which the customers engage. Transactions history/usage tracking device 214 may track and store transaction history information that details digital content viewed, rented and/or purchased by a customer.

Client device 130 may, via search/browse device 213, search and/or browse content in the content catalog stored by content catalog device 211. Upon selection of desired digital content, client device 130 may log-in and purchase the selected digital content. Notification device 223 may notify client device 130 regarding of the availability of digital content identified through catalog device 211.

Program device 215 may include one or more devices that provide applications related to the digital content to client device 130. For example, program device 215 may provide Internet resources (e.g., search results) related to an item or person currently being displayed or discussed in the digital contents. Program device 215 may enable communications between client device 130 and other users about the digital content. Program device 215 may receive feedback or comments (e.g., engaging in social media) regarding the digital content. Program device 215 may also provide to an interface that enables additional transactions related to the digital content, such as to rent or buy a physical copy of the digital content. Program device 215 may identify other digital content based on the digital content 720. For example, program device 215 may identify other digital content associated with an actor included in the digital content.

Backend devices 220 may include one or more devices for performing backend functions. Backend devices 220 may include, for example, a billing device 221, an account/profile device 222, a notification device 223, an offer management device 224, a recommendations device 225, a ratings/reviews device 226 and a customer support device 227.

Billing device 221 may include a network device that processes rental and/or purchase transactions of content from content provider 120 by client device 130. Billing device 221 may also process content catalog subscriptions that enable client device 130 to access content through content provider 120. The subscriptions may be billed, for example, automatically each month. Billing device 221 may act in conjunction with entitlement device 342 (described below with respect to FIG. 3) to determine whether client device 130 is entitled to access content from content provider 120.

Account/profile device 222 may include a network device that maintains account information associated with client device 130, including log-in credentials used for validating log-ins by associated customers. The account information may include, for example, contact names, email addresses, mailing addresses, billing information, authorized device information, entitlement rights of content, and customer profiles (e.g., customer preferences). Notification device 223 may include a network device that provides electronic notifications to customers regarding content identified in the content catalog. The electronic notifications may include, for example, email notifications, system notifications (e.g., pop-up displays upon customer log-in), Instant Messaging (IM) notifications, or social network notifications.

Offer management device 224 may include a network device that generates offers related to customer purchase or rental of digital content. Offer management device 224 may additionally obtain or generate promotions and/or advertisements for provision in conjunction with the digital content usage. Recommendations device 225 may include a network device that recommends content to a searching or browsing customer based on, for example, the customer profile (e.g., customer preferences), content usage history, or content transaction history.

Ratings/reviews device 226 may include a network device that receives, stores and tabulates customer ratings, feedback, and/or reviews associated with digital content stored in the content catalog, or associated with promotions or advertisements provided in addition conjunction with digital content. Customer support device 227 may include a network device that provides and handles customer service-related feedback, customer questions, or credit related customer questions or requests.

The configuration of components of service provider 110 shown in FIG. 2 is for illustrative purposes. It should be appreciated that other configurations may be implemented. Therefore, service provider 110 may include additional, fewer and/or different components and/or may be configured in a different arrangement than that depicted in FIG. 2. Moreover, one or more components depicted in FIG. 2 may be associated with content provider 120. For example, as described above, content provider 120 may provide a catalog of available digital content to client device 130 and, therefore, content catalog device 211 may be associated with content provider 120 instead of or in addition to server provider 110.

Figure 3:
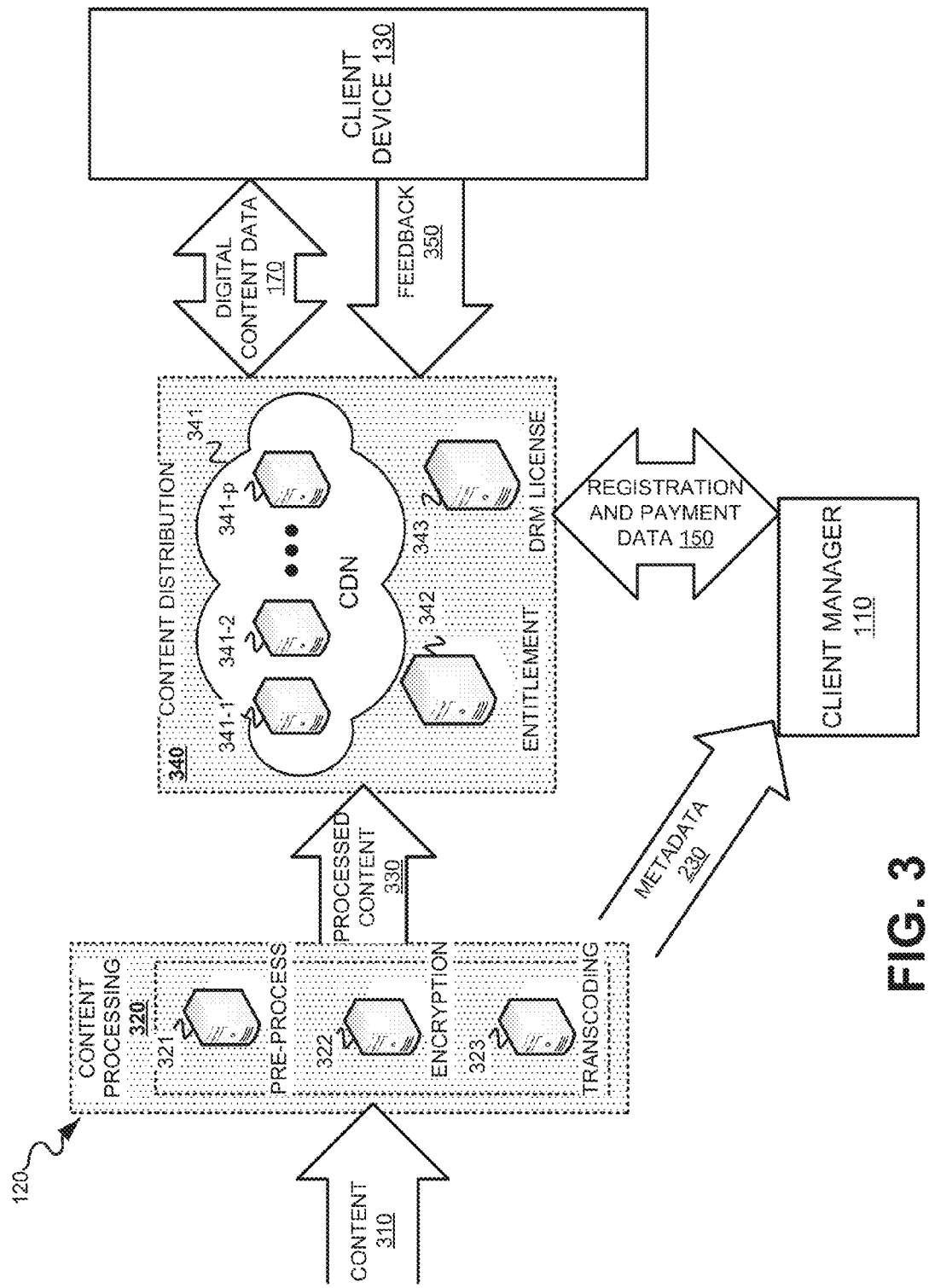
FIG. 3 is a diagram of exemplary components of the content provider included in the system of FIG. 1.

Content provider 120 may include one or more devices that perform various functions to assist in the streaming of, or downloading of, digital content data 170 to client device 130. FIG. 3 provides exemplary devices included in content provider 120 in one implementation. As illustrated in FIG. 3, content provider 120 may include content processing system 320 to receive and process content 310 to form processed content 330, and content distribution system 340 to stream or download digital content data 170 to client device 130.

Content processing system 320 may include, for example, pre-processing device 321, encryption device 322, and transcoding device 323. Pre-processing device 321 may include a network device that converts received digital content 310 into a desired format. For example, digital content 310 may be received in a multiple formats, and processed digital content 330 may be outputted in a standardized format. Encryption device 322 may include a network device that applies digital rights management (DRM) rules to encrypt the received digital content 310 so that only authorized client device 130 can access the digital content.

Transcoding device 323 may include a network device that converts the digital content into a desired format. The output file for the digital content can be one large file for downloading, or a series of segmented files for streaming. The segmented files may have different resolutions so that different bit rate streams can be delivered via the network bandwidth for smooth streaming. In an exemplary implementation, transcoding device 323 may convert the received digital content 310 into, for example, an adaptive bitrate streaming format such hypertext transport protocol (HTTP) live streaming (HLS) files, HTTP dynamic streaming (HDS) files, and/or smooth Streaming files.

Content processing system 320 may extract metadata 230 when processing the digital content. Content processing system 320 may use metadata 230 to form a content catalog describing the digital content 310 and/or processed digital content 330 available through content provider 120. Content processing system 320 may also send metadata 230 associated with digital content 310 and/or processed digital content 330 to service provider 110. The content catalog may identify a library of digital content provided by content provider 120 and may also include associated data that can be used for searching the content catalog.

Processed content 330, forwarded to content distribution system 340, may include encrypted versions of the digital content 310. Processed content 330 may be encrypted by encryption device 320-2 based on encryption keys. Processed content 330 forwarded to content distribution system 340 may also include data associated with the encryption keys that is used by content distribution system 340 to handle, handle, and/or decrypt the encrypted digital content.

Content distribution system 340 may include content delivery network (CDN) 341, which may further include content delivery nodes 341-1 through **341-*p*, entitlement device 342, and a DRM license device 343. CDN 341 may include multiple content delivery nodes 341-1 through 341-*p* that deliver digital content to client device 130. Content delivery nodes 341-1 through 341-*p*** may be distributed geographically based on customer demand in different geographic regions.

Entitlement device 342 may include a network device that stores/accesses an entitlement database storing the encrypted digital content received from content processing system 320. Entitlement device 342 may associate the encrypted digital content and a customer profile associated with client device 130 to enforce limitations on content can be accessed via client device 130. Entitlement can be verified before a DRM license key is issued to client device 130. Entitlement may also be verified before application devices 210 issue a content download uniform resource identifier (URI) or uniform resource locator (URL) associated with CDN 341 so that only entitled client device 130 has access to the encrypted digital content. Typically, the encrypted digital content may only be consumed by entitled customers on designated devices having DRM protections.

DRM license device 343 may include a network device that interacts with content processing system 320 to ensure that processed digital content 330 is encrypted according to DRM rules. DRM license device 343 may issue, validate, and enforce the DRM licenses to client device 130. DRM license device 343 may also distribute DRM license keys so that only those customers who are entitled to may consume the content on designated client device 130 with DRM protections.

The configuration of components of content provider 120 shown in FIG. 3 is for illustrative purposes. It should be appreciated that other configurations may be implemented. Therefore, content provider 120 may include additional, fewer and/or different components and/or may be configured in a different arrangement than that depicted in FIG. 3. Moreover, one or more components depicted in FIG. 3 may be associated with service provider 110. For example, service provider 110 in addition to or instead of content provider 120, may include DRM license device 343 to handle encryption keys associated with client device 130.

Figure 4:
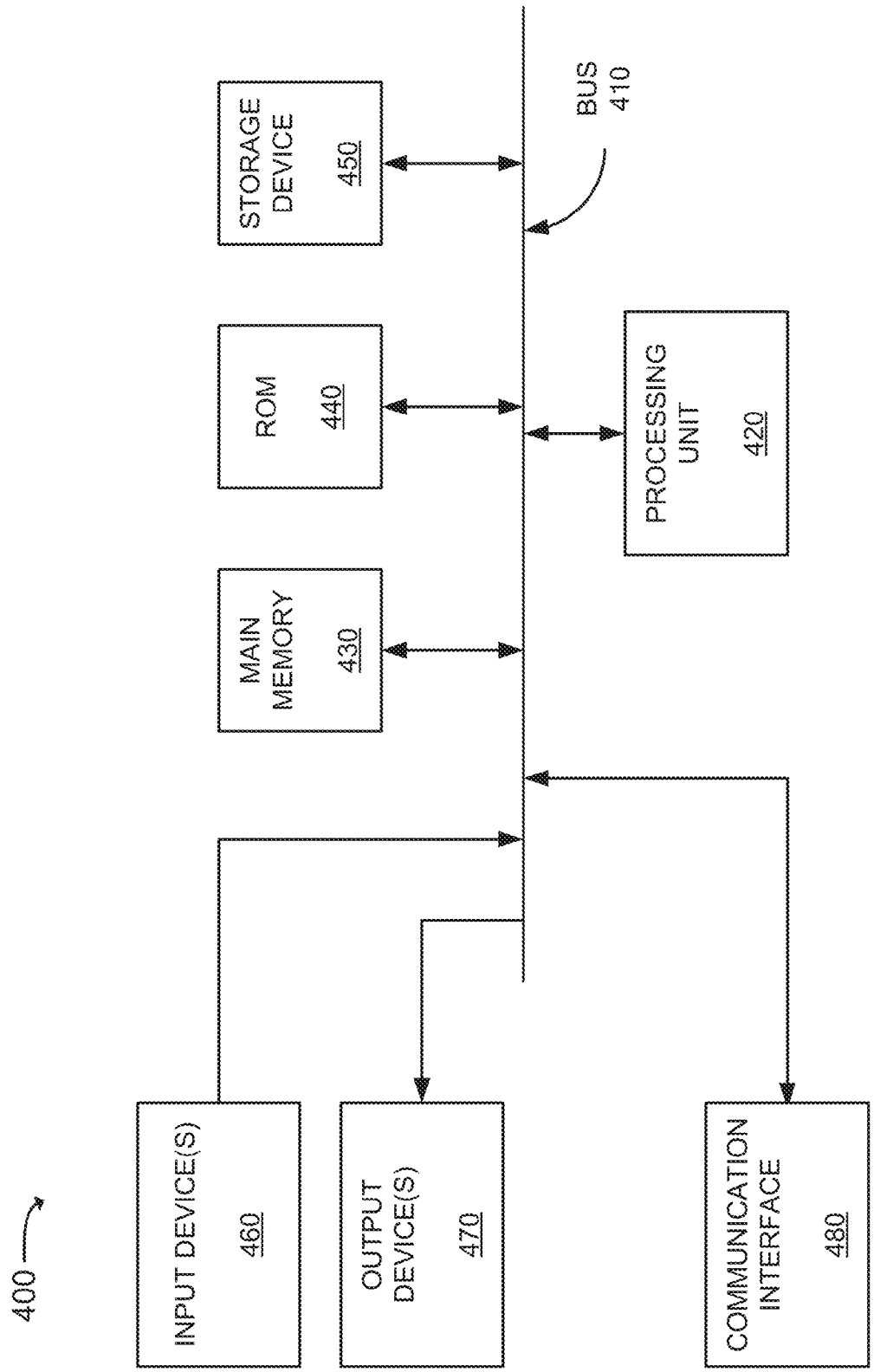
FIG. 4 is a diagram of exemplary components of a device that may be used within the system of FIG. 1.

FIG. 4 is a diagram that depicts exemplary components of a network device 400. Network device 400 may correspond, for example, to any of the components of service provider 110 (e.g., application devices 210, backend device 220, etc.), any of the components of content provider 120 (e.g., pre-processing device 321, encryption device 322, transcoding device 323, nodes of CDN 341, entitlement device 342, DRM license device 343) and/or client device 130.

Network device 400 may include a bus 410, a processing unit 420, a main memory 430, a read only memory (ROM) 440, a storage device 450, an input device 460, an output device 470, and a communication interface(s) 480. Bus 410 may include a path that permits communication among the components of network device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible non-transitory computer-readable medium."

Input device 460 may include one or more mechanisms that permit an operator to input information to network device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Input device 460 and output device 470 may, in some implementations, be implemented as a user interface (UI) that displays UI information and which receives user input via the UI. Communication interface(s) 480 may include a transceiver that enables network device 400 to communicate with other devices and/or systems. For example, communication interface(s) 480 may include wired or wireless transceivers for communicating via CDN 341.

The configuration of components of network device 400 illustrated in FIG. 4 is for illustrative purposes. Other configurations may be implemented. Therefore, network device 400 may include additional, fewer and/or different components than those depicted in FIG. 4.

Figure 5:
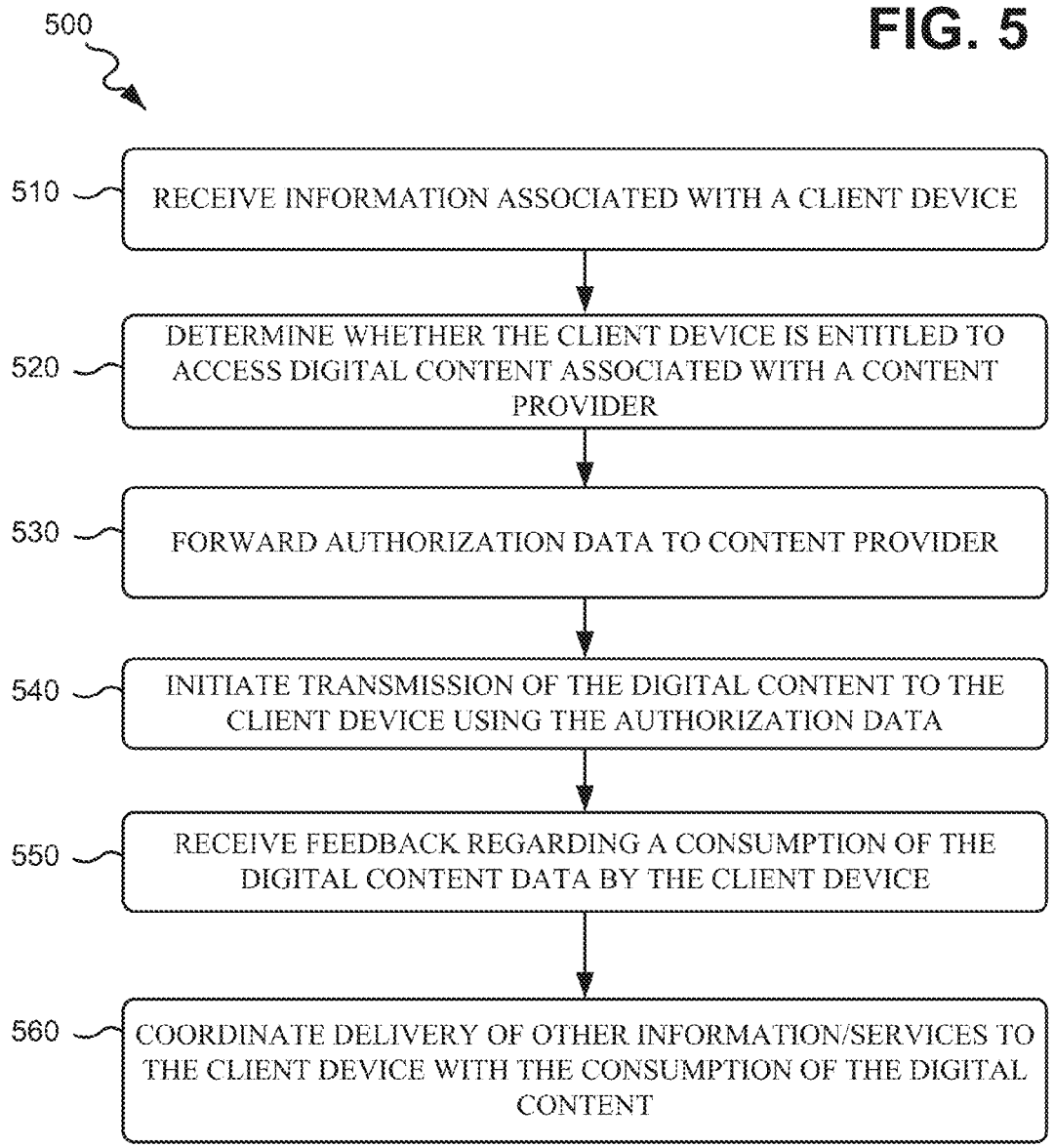
FIG. 5 is a flow diagram of an exemplary process for managing and delivering digital content within the system of FIG. 1.

FIG. 5 provides a flow diagram for an exemplary process 500 for managing, by service provider 110, delivery of digital content from one or more content providers 120 to client device 130. As illustrated in FIG. 5, service provider 110 may receive information, such as order and payment data 150, associated with client device 130 (block 510). For example, service provider 110 may determine information identifying client device 130 (e.g., a network address, account number, a location of an associated customer premises, serial number associated with client device 130, a customer name associated with client device 130, etc). Service provider 110 may request the information from client device 130 or from a third party (e.g., a service provider or a telephone communications company), and/or service provider 110 may dynamically determine the information based on communications associated with client device 130. For example, service provider 110 may determine a network address for client device 130 based on parsing a communication associated with client device 130, and/or determine a physical location associated with client device 130 based on the location of one or more devices (e.g., a base tower, a network access point, a router, etc.) in communications with client device 130. Service provider 110 may also provide an interface (not illustrated) to request submission of information from client device 130.

The information associated with client device 130, identified in block 510, may also include payment information and/or data identifying other client devices associated with the customer, or the information associated with client device 130 may be used to determine the payment information and/or the data identifying other client devices 130 (e.g., performing a lookup for information associated with client device 130 and/or the associated customer).

In one implementation, the information identified in block 510 may include a request from client device 130 for digital content associated with content provider 120. For example, service provider 110 may receive a message or other communication from client device 130 requesting the digital content. The request may include information identifying the digital content (e.g., a title or other identifier associated with the digital content) and/or content provider 120. The request may also include information identifying a time associated with the request (e.g., a time when the digital content is to be accessed by client device 130). The request may further include, for example, information regarding a requested format and/or version of the content (e.g., a standard definition version or a high-definition version of the digital content). When a fee is required for accessing the digital content, order and payment data 150 received in block 510 may further include payment information (e.g., a bank account number, a credit card number, etc.) and/or data authorizing service provider 110 to charge client device 130 for access to the digital content.

In block 510, service provider 110 may further receive or determine other information associated with client device 130, such as configuration information and/or location associated with client device 130, etc. Service provider 110 may further provide information to client device 130 regarding the digital content available from content provider 120, such as a title, a genera, actors, a rating, summary, pricing information, etc. associated with the digital content.

Figure 6:
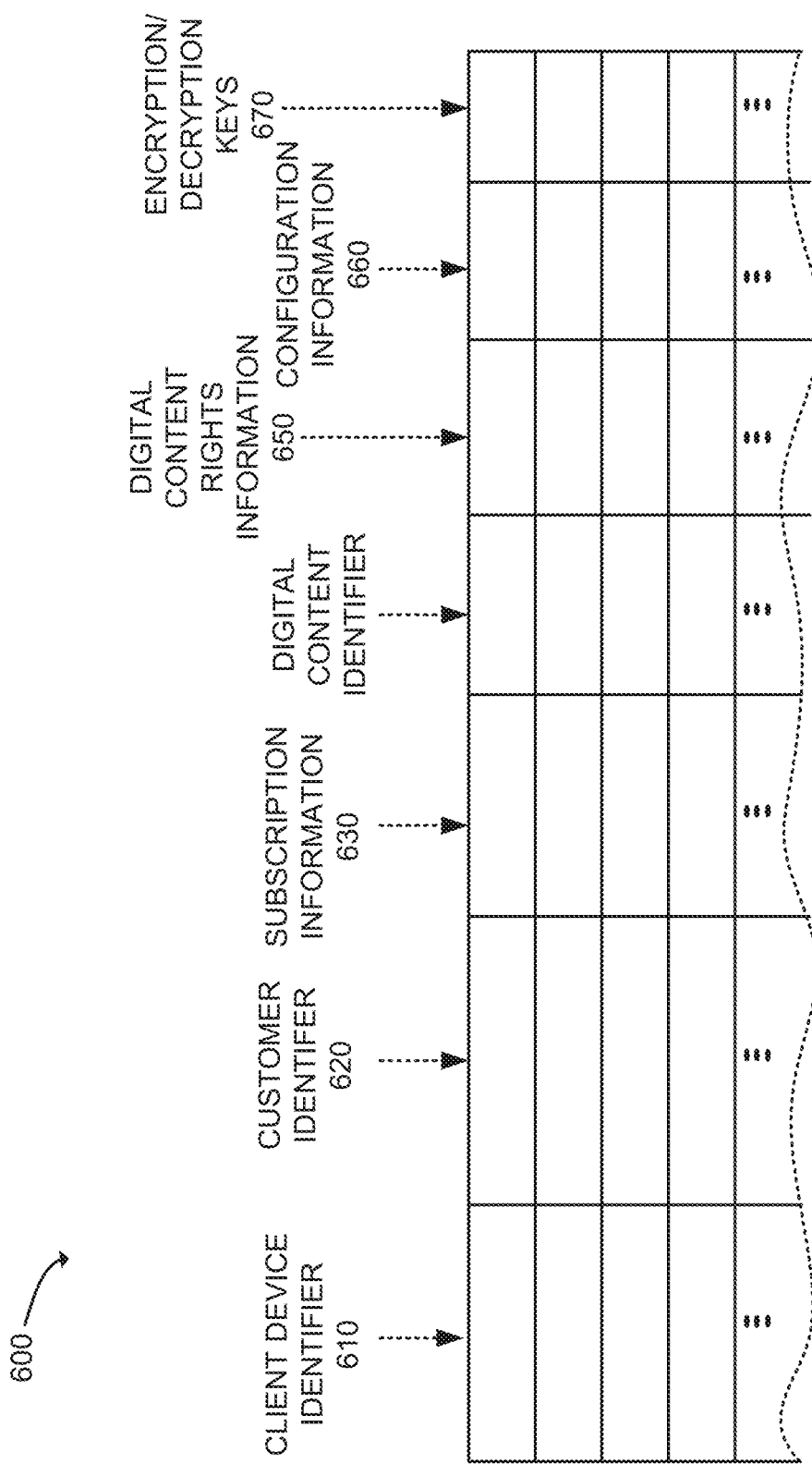
FIG. 6 is an exemplary data record storing information associated with a client device of the system depicted in FIG. 1.

In one implementation, block 510 may include service provider 110 storing a data record, such as exemplary data record 600 depicted in FIG. 6, that is based on the received information. Data record 600 may include information associated with client device 130 and rights of client device 130 with respect to the digital content provided by content provider 120. For example, as illustrated in FIG. 6, data record 600 may include client device identifier 610 identifying client device 130, customer identifier 620 identifying a customer associated with client device 130, and subscription information 630 identifying digital content subscriptions associated with the customer.

Data record 600 may further include digital content identifiers 640 and digital content rights information 650 associated with digital content identifiers 640. For example, digital content rights information 650 may indicate whether a customer associated with customer identifier 620 has paid a one-time usage fee the digital content or whether a subscription identified in subscription information 630 entitles the identified customer to access the digital content. Digital content rights information 650 may also indicate whether client device 130, associated with client device identifier 610, is entitled to access the digital content. For example, digital content rights information 650 may indicate that the digital content is available at a location associated with client device 130. Data record 600 may further include configuration information 660 that identifies a version of the digital content that is compatible with client device 130.

In one implementation, data record 600 may also include encryption/decryption keys 670 that may be used by content provider 120 to encode digital content and/or by client device 130 to decode the digital content. For example, service provider 110 may provide encryption/decryption keys 670 to client device 130 and/or may provide encryption/decryption keys 670 to content provider 120 if client device 130 is authorized to access the digital content.

Data record 600 illustrated in FIG. 6 is for provided for illustrative purposes. In other implementations, additional, fewer, or different data may be used than depicted in FIG. 6, and the data may be organized differently. For example, in other implementations, data record 600 may include additional information identifying, for example, other client devices 130 associated with a customer, a time window when digital content rights information 650 are valid, use information associated with the digital contents, etc.

Returning to process 500 depicted in FIG. 5, service provider 110 may process the received information (e.g., order and payment data 150) to determine whether client device 130 is entitled to access the requested digital content (block 520). For example, service provider 110 may determine, based on order and payment data 150, whether the requested digital content is available for access to client device 130. For example, service provider 110 may determine whether content provider 120 permits delivery of the requested digital content to a geographic location associated with client device 130 and/or whether the digital content is available at the time associated with the request for the digital content. Service provider 110 may also determine whether an available version of the digital content is compatible with client device 130. For example, client manager may determine formats compatible with client device 130. If a compatible version of the digital content is available for client device 130, service provider 110 may determine whether client device 130 is authorized to access the version of the digital content. For example, service provider 110 may determine whether a subscription or a one-time usage fee to access the digital content has been purchased for client device 130 (e.g., by evaluating data record 600).

When client device 130 is entitled to access the digital content, service provider 110 may forward data (e.g., authentication data 160) to content provider 120 (block 530). The authentication data 160 may include, for example, information identifying client device 130 and the requested digital content. The authentication data 160 data may further include, for example, information confirming that client device 130 is authorized to access the requested digital content. For example, the authentication data 160 may include information confirming payment of a fee associated with a subscription or a one-time use license associated with the digital content.

In one implementation, authentication data 160 may include encryption information (e.g., encryption/decryption key 670) associated with client device 130. Content provider 120 may use the encryption information to encode the digital content such that client device 130 (or an associated device) can access the digital content.

The content provider 120 may initiate access of the digital content (e.g., digital content data 170) by client device 130 using information included in authentication data 160 (block 540). For example, content provider 120 may initiate a session to client device 130, and the digital content data 170 may be provided to client device 130 during the session. In another implementation, when client device 130 is entitled to access the requested digital content, service provider 110 may also provide client device 130 with information to access the requested digital client via content provider 120, such as a storage address or a link to digital content data 170.

Block 540 may also include content provider 120 using authentication data 160 to provide digital content data 170 to client device 130. For example, content provider 120 may initiate a session with client device 130 using information included in authentication data 160. Alternatively or in addition, content provider 120 may authenticate a request from client device 130 for client device 130 using authentication data 160. Authentication data 160 may further identify other client devices 130 associated with the customer that may also be authorized to receive the requested digital content. For example, a customer can use a first client device 130 (e.g., a personal computing device) may request access by a second client device 130 (e.g., a handheld device).

Digital content data 170 may include a version of the requested digital content that is formatted to be compatible with client device 130 and/or network 140. For example, content provider 120 may select a version of the digital content based on configuration information about client device 130 (e.g., compatible display and/or sound output formats) or network 140 (e.g., bandwidth, quality of service, etc. that are associated with network 140). The compatibility of information may be received from client device 130 and/or service provider 110 or may be dynamically determined by content provider 120 (e.g., based on communications between content provider 120 and client device 130).

When providing digital content data 170 to client device 130 in block 540, content provider 120 may perform digital rights management (DRM) on the requested digital content. For example, digital content data 170 may include an encrypted version of the requested digital content that can be decrypted by client device 130. Client device 130 or another device associated with the customer may decrypt digital content data 170 using, for example, information included in order and payment data 150. Content provider 120 may use DRM techniques to prevent access to the digital content by an unauthorized third-party even if the third party receives a copy of the encrypted content. Furthermore, DRM techniques content may also be used to limit access to the digital content by client device 130 after a particular period of time and/or after use of the digital content.

Client device 130 may provide feedback to content provider 120 and/or service provider 110 regarding a use and/or a status of digital content data 170 (block 550). For example, client device 130 may report, substantially in real-time, a portion of digital content data 170 being decrypted, played, viewed, stored, etc. by client device 130. Client device 130 may also provide metadata identifying features of digital content being currently viewed (e.g., a person or item being depicted in a particular portion of the digital content). This type of status information may allow content provider 120 coordinate provision of additional digital content (e.g., providing a commercial for other digital content, after digital content is consumed on client device 130). This type of information may also allow content provider 120 to track use of the digital content by client device 130 and take appropriate action to limit unauthorized use, such as encrypting the digital content with a different encryption key after a period of time.

Service provider 110 may use the status information to coordinate delivery of other information/services to client device 130 with the consumption of the digital content (block 560). For example, while client device 130 is presenting a portion of a digital content, service provider 110 may enable the customer to browse/search catalogs of other digital content and/or may enable client device 130 to request access to the other digital content at another time or through another client device 130. Service provider 110 may also provide Internet resources (e.g., search results) related to an item or person currently being displayed or discussed in a portion of the digital content. Service provider 110 may also enable communications between client device 130 and other users viewing/using the digital contents. Service provider 110 may also enable the customer to use client device 130 to provide feedback or comments (e.g., engaging in social media) regarding the digital content while the digital content is being presented via client device 130. Service provider 110 may also display an interface that enables additional transactions related to the digital content, such as to rent or buy a physical copy of the digital content.

Service provider 110 may also identify a portion of the digital content that is not accessed through client device 130, and authorize the customer to access to this portion of the digital content through client device 130 (or another client device 130) at a later time. For example, service provider 110 may forward updated authorization information to content provider 120 regarding the other client device 130 and the unviewed portion of the digital content.

Although FIG. 5 shows an exemplary process 500 for managing, by service provider 110, delivery of digital content from content provider 120 to client device 130, additional, fewer, or different steps than depicted in FIG. 5 may be used in other implementations. For example, in other implementations, content provider 120 may provide a portion of digital content data 170 to client device 130 before receiving authentication data 160 and may provide another portion of digital content data 170 after receiving authentication data 160. In another implementation, service provider 110 may provide authorization information to content provider 120 without receiving order and payment data 150 and may acquire order and payment data 150 after client device 130 initiates access to the digital content.

Figure 7:
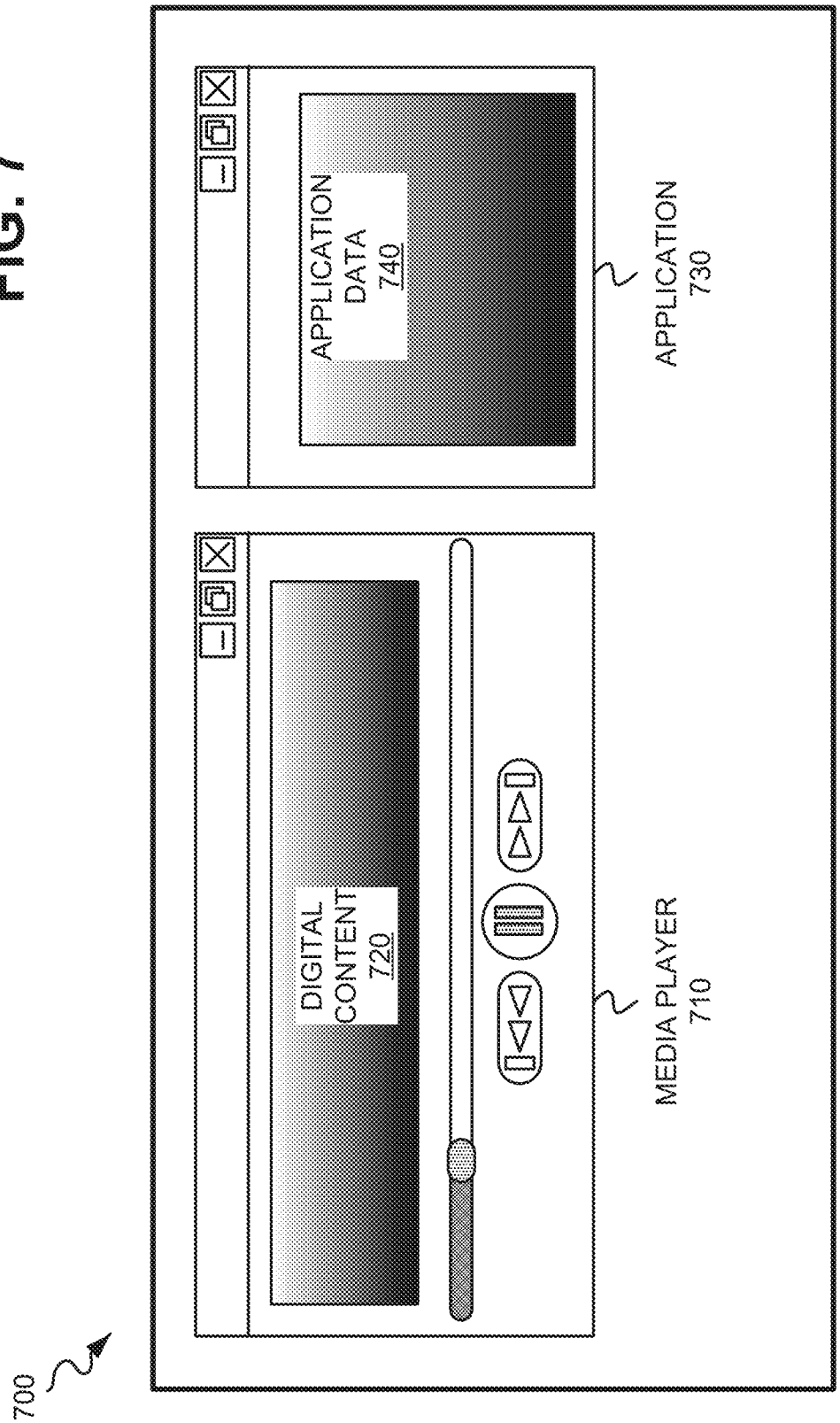
FIG. 7 is an exemplary display may be provided by a client device in the system of claim 1.

FIG. 7 depicts an exemplary display 700 may be provided by client device 130 in accordance with an implementation described herein. As illustrated in FIG. 7, display 700 may include a media player 710 to present digital content 720 derived from digital content data 170. For example, media player 710 may determine audio/visual information included in digital content data 170 and present this information via display 700.

Media player 710 may also determine real-time information regarding digital content 720 and may provide this information to service provider 110 and/or content provider 120. For example, media player may identify a portion of the digital content 720 being presented (e.g., a time signature associated with a presented portion of digital content 720). Alternatively or in addition, media player 710 may determine places, items, and/or people associated with a presented portion of the digital content. For example, digital content 720 may include codes or other data identifying places, items, and/or people presented in a portion of the digital content 720, and media player 710 may identify these codes. Media player 710 may also process the digital content 720 to dynamically recognize the places, items, and/or people. For example, media player 710 may perform facial or voice recognition on the digital content 720 to dynamically recognize a person.

Display 700 may further include an application 730 that presents application data 740 related to digital content 720. For example, application data 740 may provide Internet resources (e.g., search results) related to an item or person currently being displayed or discussed in a portion of digital content 720. Application data 740 may relate to communications between client device 130 and other users viewing/using a related portion of the digital content 720. Application data 740 may relate to receiving feedback or comments (e.g., engaging in social media) regarding the presented portion of digital content 720. For example, if at least a threshold portion (e.g., more than half) of digital content 720 is presented through media player 710, application 730 may request a rating for digital content 720, and if less than a threshold portion of the digital content 720 is presented, application 730 may present an interface asking why the viewer did not access more of the digital content 720. Application data 740 may also relate to an interface that enables additional transactions related to the digital content, such as to rent or buy a physical copy of the digital content. Application data 740 may also identify other digital content based on the presented portion of digital content 720. For example, Application data 740 may identify other digital content associated with an item, an actor or a place associated with a portion of digital content 720. In another implementation, if at least the threshold portion of digital content 720 is presented through media player 710, application 730 may advertises similar digital content, and if less than a threshold portion of the digital content 720 is presented, application 730 may recommend different types of digital content.

Display 700 shown in FIG. 7 is for provided for illustrative purposes. In other implementations, display 700 may include additional, fewer, or different visual objects than depicted in FIG. 7. For example, in other implementations, display 700 may include multiple applications 730, or portions of display 700 may be provided on different client devices 130. For example, media player 710 may be provided on a first client device 130, and application 730 may be provided on a second, different client device 130.

The foregoing description provides illustration and description, but is not intended to be exhaustive or to limit the invention to the precise form disclosed. Modifications and variations are possible in light of the above teachings or may be acquired from practice of the invention. For example, while series of blocks has been described with respect to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

In the preceding specification, various preferred embodiment have been described with reference to the accompanying drawings. It will, however, be evident that various modifications and changes may be made thereto, and additional embodiments may be implemented, without departing from the broader scope of the invention as set forth in the claims that follow. The specification and the drawing are accordingly to be regarded in an illustrative rather than restrictive sense.

What is claimed is:

1. A method comprising:
   receiving, by a network device associated with a service provider, an order from a client device for digital content provided by a content provider that differs from the service provider;
   determining, by the network device and based on receiving the order, that the client device is authorized to access the digital content;
   forwarding, by the network device and based on determining that the client device is authorized to access the digital content, authentication data to the content provider, the authentication data including information identifying the client device and an indication that the client device is authorized to access the digital content, wherein the content provider establishes a session with the client device based the authentication data and provides access by the client device to the digital content via the session, and wherein the service provider does not receive access to the session;
   receiving, by the network and from the client device, status information identifying a portion of the digital content being accessed by the client device from the content provider during a time period; and
   providing, by the network and concurrently with the access by the client device to the digital content via the session, application data related to the portion of the digital content.

2. The method of claim 1, wherein the application data relates to at least one of:
  search results related to an item, place, or associated with the portion of the digital content,
  communications between the client device and other users accessing the digital content,
  receiving feedback or comments regarding the digital content,
  providing an interface for an additional transaction related to the digital content, or
  identifying other digital content based on the digital content.

3. The method of claim 1, where determining that the client device is authorized to access the digital content includes:
  determining that a payment associated with accessing the digital content has been received from the client device, wherein the indication that the client device is authorized to access the digital content includes data confirming the payment.

4. The method of claim 1, wherein the content provider establishes the session via a content delivery network that is not associated with the service provider, and the application data is provided via a service network that differs from the content delivery network.

5. The method of claim 1, further comprising:
  forwarding, to the client device, a catalog identifying the digital content; and
  receiving from the client device, a request for the digital content,
    wherein determining that the client device is authorized to access the digital content is based on receiving the request.

6. A non-transitory computer-readable medium to store instructions, the instructions comprising:
  one or more instructions that, when executed by a processor associated with a service provider, cause the processor to:
    receive an order from a client device for digital content provided by a content provider that differs from the service provider;
    authenticate, based on receiving the order, the client device to produce authentication data, wherein the authentication data includes information identifying the client device and an indication that the client device is authorized to access the digital content;
    forward the authentication data to the content provider, wherein the content provider uses the authentication data to establish a session with the client device and provides access by the client device to the digital content via the session, and wherein the service provider does not receive access to the digital content;
    receive, from the client device, status information identifying a portion of the digital content being accessed by the client device via the session and during a time period; and
    provide, during the time period and concurrently with the access by the client device to the digital content via the session, application data related to the portion of the digital content.

7. The non-transitory computer-readable medium of claim 6, wherein the status information is received substantially in real-time as the client device accesses the portion of the digital content.

8. The non-transitory computer-readable medium of claim 6, wherein the application data relates to at least one of:
  search results related to an item, place, or associated with the portion of the digital content,
  communications between the client device and other users accessing the digital content,
  receiving feedback or comments regarding the digital content,
  providing an interface for an additional transaction related to the digital content, or
  identifying other digital content based on the digital content.

9. The non-transitory computer-readable medium of claim 6, wherein the one or more instructions to provide the application data include:
  one or more instructions to:
    determine whether at least a threshold portion of the digital content is accessed by the client device during the time period,
    recommend similar digital content when at least the threshold portion of the digital content is accessed by the client device during the time period, and
    recommend dissimilar digital content when less than the threshold portion of the digital content is accessed by the client device during the time period.

10. The non-transitory computer-readable medium of claim 6, wherein the instructions further comprise:
  one or more instructions to determine encryption data associated with the client device, and
  wherein:
    the authentication data further includes the encryption data associated with the client device,
    the content provider encrypts the digital content based on the encryption data, and
    the content provider enables the client device to access the encrypted digital content.

11. The non-transitory computer-readable medium of claim 6, wherein the instructions further comprise:
  one or more instructions to determine configuration information associated with the client device, and
  wherein:
    the authentication data further includes the configuration information,
    the content provider stores a plurality of versions of the digital content,
    the content provider identifies, based on the configuration information, a particular version, of the plurality of versions of the digital content, that is compatible with the client device, and
    the content provider provides the particular version of the digital content to the client device.

12. The non-transitory computer-readable medium of claim 6, wherein the content provider establishes the session via a content delivery network that is not associated with the service provider, and the application data is provided via a service network that is distinct from the content delivery network.

13. The non-transitory computer-readable medium of claim 6, wherein the client device is a first client device associated with a user, the authentication data is first authentication data, and the session is a first session, and
  wherein the one or more instructions further cause the processor to:
    identify a second client device associated with the user;
    generate second authentication data based on the first authentication data and the status information, wherein the second authentication data includes an indication that the second client device is authorized to access a portion of the digital content that is not accessed by the user via the first client device; and provide the second authentication data to the content provider, wherein the content provider uses the second authentication data to establish a second session with the second client device, and the content provider provides access by the second client device to the portion of the digital content via the second session.

14. A device comprising:
a memory configured to store data associated with a client device; and
a processor configured to:
  receive an order from a client device for digital content provided by a content provider, wherein the device is associated with the service provider that differs from the content provider,
  determine, based on the data associated with the client device, that the client device is authorized to access the digital content,
  produce, based on determining that the client device is authorized to access the digital content, authentication data, wherein the authentication data includes an indication that the client device is authorized to access the digital content,
  forward the authentication data to the content provider associated with digital content, wherein the content provider uses the authentication data to establish a session with the client device and provides access by the client device to the digital content via the session, and wherein the service provider does not receive access to the digital content,
  receive, from the client device, status information identifying a portion of the digital content being accessed by the client device during a time period, and
  provide, during the time period and concurrently with the access by the client device to the digital content via the session, application data related to the portion of the digital content.

15. The device of claim 14, wherein the processor is further configured to:
  determine encryption data associated with the client device, and
  wherein:
    the authentication data further includes the encryption data associated with the client device,
    the content provider encrypts the digital content based on the encryption data, and
    the content provider enables the client device to access the encrypted digital content.

16. The device of claim 14, wherein:
the authentication data includes information identifying a location associated with the client device,
the content providers identifies, based on the location associated with the client device, other digital content associated with the content provider that is available for access by the client, and
the content provider provides, to the client device, data identifying the other digital content.

17. The device of claim 14, wherein:
the client device is a first client device,
the processor is further configured to identify, based on the stored data, a second client device associated with the first client device,
the authentication data identifies the second client device, and
the content provider provides access by the second client device to the digital content based on receiving the authentication data.

18. The device of claim 14, wherein:
the content provider is associated with a content delivery network (CDN) that provides access to the digital content, and
the client device receives an address, associated with the CDN, to access digital content.

19. The device of claim 14, wherein:
the authentication data further includes configuration information associated with the client device,
the content provider stores a plurality of versions of the digital content,
the content provider identifies, based on the configuration information, a particular version, of the plurality of versions of the digital content, that is compatible with the client device, and
the session enables the client device to access the particular version of the digital content.

20. The device of claim 14, wherein the client device is a first client device associated with a user, the authentication data is first authentication data, and the session is a first session, and
wherein the processor is further configured to:
  identify a second client device associated with the user;
  generate second authentication data based on the first authentication data and the status information, wherein the second authentication data includes an indication that the second client device is authorized to access a portion of the digital content that is not accessed by the user via the first client device; and
  provide the second authentication data to the content provider, wherein the content provider uses the second authentication data to establish a second session with the second client device, and the content provider provides access by the second client device to the portion of the digital content via the second session.

* * * * *